Figure 2:
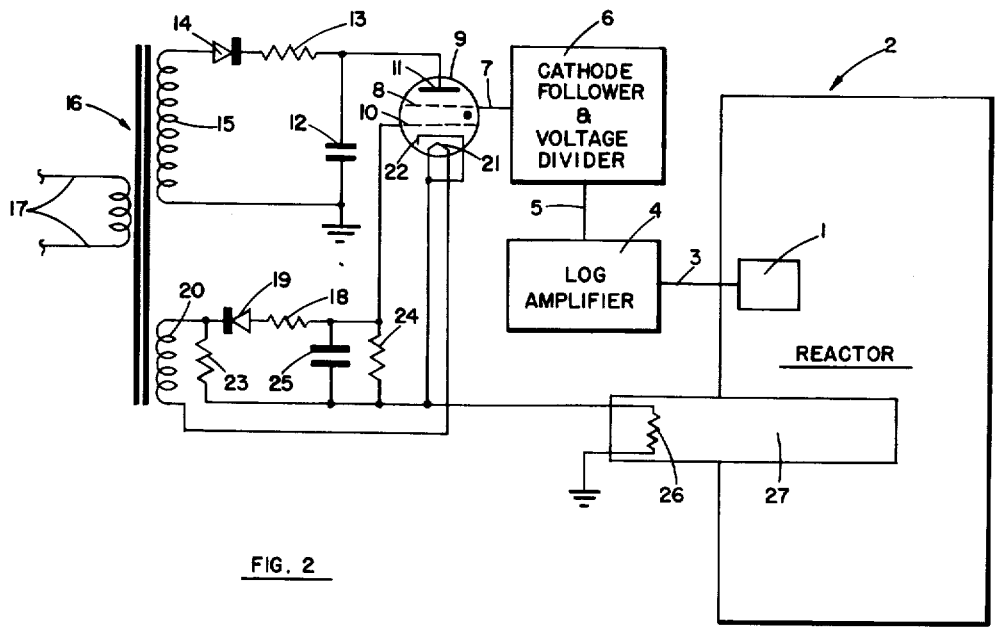

May 22, 1962   B. G. SEELEY ET AL   3,035,995
ELECTRONIC REACTOR SAFETY CONTROL DEVICE
Filed Aug. 11, 1958

INVENTORS
CHARLES C. WEEKS
BERNARD G. SEELEY

BY

William N. Patrick

United States Patent Office 3,035,995
Patented May 22, 1962

3,035,995
ELECTRONIC REACTOR SAFETY CONTROL DEVICE
Bernard G. Seeley and Charles C. Weeks, Canoga Park, Calif., assignors to North American Aviation, Inc.
Filed Aug. 11, 1958, Ser. No. 754,491
7 Claims. (Cl. 204—193.2)

This invention relates to a novel reactor safety system. More particularly, this invention relates to a simplified and improved control system for shutting down a nuclear reactor.

Safety of personnel in the vicinity of an atomic reactor, and the safety of the reactor itself, has always been a primary concern. The primary hazards of operation of a reactor, which must be taken into consideration in designing a control or safety system, are excessively high level of neutron flux and excessively short period of flux increase. The normal control system of a reactor has safety features built in so that under these circumstances the control rods will be returned to the core of the reactor to effect a shutdown. To provide for the possibility of an accident in which the control system is rendered inoperative, it is most desirable to have a back-up safety system that would shut the reactor down.

Maximum safety may be obtained by having a control system with many "fail-safe" features. However, so many interlocking features can be built into the system that it becomes quite complicated and a source of excessive "down time" of the reactor due to component failure. The use of independent safety devices offers a solution compromising neither reactor safety nor reactor operating time. The control system should be adequate to handle most circumstances, and the independent safety system should provide the ultimate safety.

A good safety system should cost the reactor little or no reactivity in its ready or standby state. In the case of an accident, it should be capable of rendering the reactor subcritical, without the aid of the control system, before it reaches an unsafe power.

Although power reactors will probably become the largest group eventually, the need at present is greatest in research reactors. Many of these have large amounts of excess reactivity included in the core to take care of those losses caused by experiments. Also, the programming of these reactors is usually not constant, with each start-up affected by different experiments and different configurations. In addition, due to the variety of applications of such an experimental machine, there is always the possibility of unforeseen situations which could cause a potential hazard. These considerations make the need of safety devices for research reactors most urgent.

It is therefore an object of this invention to provide a control system having a multiplicity of "fail-safe" features. It is also an object of this invention to provide a control system which will effectively act to shut down a nuclear reactor at the outset of a nuclear incident. It is a further object to provide a control system which can fire an explosive fuse or trigger a pressurized system to shut down a reactor in a matter of milliseconds. Another object is to provide a control system which is fail-safe against power failure or electronic tube burn-out. Still another object is to provide a control system which is insensitive to line power fluctuations. It is likewise an object to provide a control system which can be set to shut down a nuclear reactor at a predetermined neutron flux level. It is also an object of this invention to provide a control system which may be operated in conjunction with a variety of different sensing devices within the nuclear reactor which may be required to be shut down rapidly in case of a nuclear incident.

Figure 1:
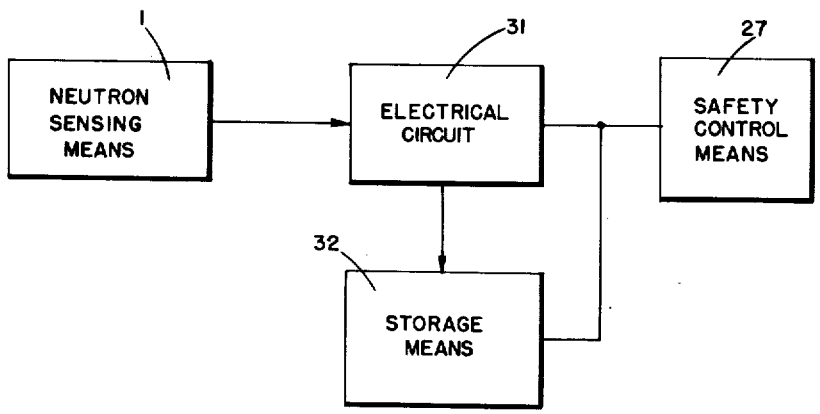

The above and other objects of this invention are accomplished by a safety control system comprising a neutron sensing means which is connected to an electronic circuit means which in turn is connected to a safety control means. Thus, as shown in FIGURE 1 of the accompanying drawings, the neutron sensing means 1 which can be suitably positioned in or adjacent to a nuclear reactor, feeds a signal to the electronic circuit means 31, which upon a signal of a certain magnitude from the neutron sensing means 1, functions to activate the safety control means 27 which extends into the interior of nuclear reactor and acts to shut down the reactor. In order to impart certain fail-safe features to the system in case of (a) momentary loss of line voltage supply, (b) complete loss of line voltage supply, and (c) in case a thyratron tube is used as an electric valve, to prevent failure of the system should the cathode heater element fail to function, it has been found advisable to provide a storage means 32 as shown in FIG. 1, so that the combination of electric circuit 31 and storage means 32 will function to activate the safety control means 27 and shut down the nuclear reactor either upon the loss of line voltage or upon the burn out of the heater element. In providing the storage means in conjunction with the electric circuit, it has been found advisable to incorporate the storage means within the electrical circuit system. An illustrative example of electronic reactor safety control device is given in FIG. 2 in which the storage means has been incorporated within the electrical circuit in the form of capacitors.

The electronic reactor safety control device of this invention may be broadly described as a fail-safe control apparatus for a nuclear reactor comprising an electronic valve having a pair of output electrodes, a source of operating potential coupled to these output electrodes to establish an operating potential across the output electrodes, bias means for normally limiting conduction of the electronic valve, an actuator or neutron absorbing safety control means connected to one of the electrodes and operative in response to conduction in a predetermined amount of the electronic valve, condition responsive means for increasing conduction of the electronic valve, and a means responsive to failure of the source of operating potential for increasing conduction of the valve to the aforementioned predetermined amount, whereby the actuator or neutron absorbing control means will be operated upon failure of the source of operating potential. The electronic valve will also conduct upon receiving a signal of the proper magnitude from the condition responsive means. When the electronic valve is a thyratron, which contains a cathode heater element, a heater source is coupled to the heater element, and means responsive to failure of the heater source are provided for increasing conduction of the valve so as to operate the actuator upon failure of the heater element or heater source.

Referring to FIG. 2 of the drawing, condition responsive means 1 for producing a signal in response to neutron activation, such as an ionization chamber, is located within the active portion of a nuclear reactor 2.

The nuclear reactor is surrounded by a suitable biological shield, not shown, to prevent the existence of dangerous radioactivity in the vicinity of the reactor. When the condition responsive means 1 for producing a signal is an ionization chamber, it is connected to a source of voltage supply, not shown, the negative terminal of which is grounded. The signal output portion of the signal producing means 1, is connected by cable 3 to a log amplifier 4. The log amplifier is connected by cable 5 to cathode follower and voltage divider 6, which in turn is connected by cable 7 to the 2nd grid 8 of the electronic valve 9, which in this instance is a thyratron. The first grid 10 of the thyratron 9 is biased with a negative voltage. The signal from the log amplifier 4 to the second grid 8 will fire the thyratron 9 when the voltage on the 2nd grid is increased to a predetermined positive value by the condition responsive means. The plate 11 of the thyratron 9 is connected to a capacitor 12 which is charged through a resistor 13. Capacitor 12, which is interposed between the plate and the source of voltage, is a storage means which serves to maintain the plate voltage until the circuitry connected with the first grid 10 operates to fire the thyratron. The resistor 13 is in turn connected to the cathode of a diode 14 which serves as a current rectifying means. The plate side of the diode 14 is connected to a secondary coil of a power transformer 16. The secondary coil is grounded at its other end. The power transformer 16 is connected to a source of line voltage through cables 17.

The first grid 10 of the thyratron 9 is connected to a bias means for normally limiting conduction of the thyratron. Thus, the grid 10 is connected to a protective resistor 18 of the bias means. The resistor 18 is in turn connected to the plate side of a diode 19 which serves as a current rectifying means. The cathode side of the diode 19 is connected to a secondary coil 20 of the power transformer 16. In FIG. 2 the secondary coil 20 is different from the secondary coil 15 although both are part of the same power transformer 16. However, coils 15 and 20 could each be a part of an individual and separate transformer having suitable leads to a line voltage supply. The other end of the secondary 20 returns through the heater 21 of the thyratron to the cathode 22 of the thyratron. One end of resistor 23 is common to the heater 21 and cathode 22 of the thyratron and the other end is connected to the cathode side of the diode 19 which serves to reduce the voltage obtained from the secondary 20 to a value necessary to bias the thyratron. The capacitor 25 connects the first grid 10 of the thyratron to the cathode 22 of the thyratron to maintain the bias voltage for a short period of time in case of momentary loss of line voltage. Resistor 24 is connected in parallel with the capacitor 25 to determine or regulate the length of time that the capacitor 25 will maintain a bias voltage. The cathode 22 of the thyratron is also connected to ground through an electrical squib 26 in a neutron absorbing safety control means 27, sometimes referred to in this writing as an actuator, located within the reactor 2.

An embodiment of this invention is that the storage means exemplified by capacitor 25 has the characteristic that it stores the output of the bias means for a period of time which is shorter than the period of time the capacitor 12 stores the output of the source 15. Hence, when the line voltage supply fails, the bias voltage on the grid 10 would be lost before the plate voltage deteriorated. This would render the thyratron conducting, actuate the reactor shutdown mechanism 27 and close down the nuclear reactor 2. The system operates to shut down the reactor whenever the neutron flux gets to an unsafe level. The neutron flux is monitored by the ionization chamber. The shut-down of the reactor is accompanied by the release of a neutron absorbing gas into a chamber within the reactor core. As stated above, in the event of the loss of line voltage capacitor 12 will maintain the plate voltage until the circuitry connected with the first grid 10 operates to fire the thyratron. This provides a safety feature for shutting down the reactor in case of an outside power failure and thus prevents the danger of a nuclear incident which might be occasioned by failure of ordinary control methods.

When the signal producing means 1 is an ionization chamber, the current through the ionization chamber is proportional to the neutron flux incident upon the ionization chamber. This signal is amplified by the log amplifier 4. The impedance of the signal from the log amplifier is matched by the cathode follower to the second grid 8 of the thyratron. The voltage divider is adjusted so that the thyratron fires at a predetermined neutron flux or power level within the reactor core. That is, when the neutron flux in the reactor core increases, the positive signal fed to the second grid 8 of the thyratron increases until it reaches a potential necessary to fire the thyratron as determined by the setting on the voltage divider. A bias voltage is placed on the first grid 10 of the thyratron to hold it from firing in the absence of a signal on the second grid from the ionization chamber. The bias voltage is supplied by rectifying, through diode 19, the voltage produced on the secondary 20 of the power transformer 16. Since this potential is connected through the heater 21 of the thyratron 9, the bias potential would be lost in case of a burn-out of the heater, firing the thyratron. This provides a fail-safe feature in the system.

In order to prevent the thyratron from firing due to a momentary loss of line voltage which may be brought about by switching from one generator to another at the power plant, capacitor 25 is placed between the first grid 10 and the cathode 22 of the thyratron. This capacitor will maintain the bias voltage during a line power loss. However, in order to determine the length of time that the capacitor will maintain the bias voltage, in the event of complete loss of line voltage supply, a resistor 24 of an appropriate resistance is connected in parallel with the capacitor 25. Any time the thyratron conducts, current is drawn from ground through the electrical squib 26 in the control mechanism 27 which detonates the squib and results in the movement of a neutron absorbing gas into a chamber in the core of the reactor. The presence of the neutron absorbing gas in the reactor core effectively shuts down the nuclear reactor.

The safety control system of this invention may be used with any kind of reactor. Descriptions of various nuclear reactors will be found in the Proceedings of the International Conference on the Peaceful Uses of Atomic Energy, volume 2, pages 329 et seq. (1955), available at the United Nations, New York. In the swimming pool reactor described on page 420 of the Proceedings of the International Conference on the Peaceful Uses of Atomic Energy, the reactor shutdown mechanism may replace a fuel element within the core. The neutron sensitive signal device such as an ionization chamber is positioned adjacent the core and within the outer biological shield, or on the outside of the biological shield. When the neutron flux at the point where the sensing device is located reaches a certain predetermined value, the signal is fed from this device through appropriate amplifying units to the second grid of the thyratron tube causing it to conduct. The current through the tube is drawn from ground through the electrical heating element in the squib positioned within the reactor shutdown mechanism. This detonates the squib and results in the movement of a neutron absorbing gas into the chamber positioned within the core of the reactor. The presence of the neutron-absorbing gas in a larger volume within the core of the reactor effectively shuts down the nuclear reactor.

Another reactor in conjunction with which the safety control system of this invention is employed is the water boiler reactor used for kinetic experiments which is described in publication NAA–SR–1525, March 15, 1956, which is available from the Office of Technical Services, Department of Commerce, Washington 25, D.C.

The reactor shutdown mechanism which may be termed a neutron absorber release system is described in publication NAA–SR–2476 issued January 28, 1958, which is likewise available from the Office of Technical Services, Washington. A cut-away drawing of this system is shown on page 7 of the NAA–SR–2476 publication with a description of its operation on page 6. The use of this neutron absorber release system in connection with the water boiler reactor described in NAA–SR–1525 mentioned supra is likewise described in the NAA–SR–2476 publication with specific reference to page 9 through 12 inclusive. Test results are given on page 15 et seq. of the latter publication.

The shell of the neutron absorber release system is a receiver chamber that extends into the core region of the water boiler reactor mentioned above from the reflector region or beyond. A horizontal through tube passes through the reactor core within which the receiver chamber is located. A storage chamber is located at the end of the receiver furthest removed from the core, and contains the reactor poison, boron trifluoride, under high pressure. A detonation chamber containing an explosive is located at the same end. The electrical squib containing the electrical heating element designated as number 26 in FIG. 2, is located within the detonation chamber. The geometry of the neutron absorber release system is exceedingly flexible. The detonation and storage chambers can be completely outside of the reactor if desired and the receiver chamber can be made in any shape convenient to the reactor core configuration. The storage chamber is designed so that diaphragms retain the poison until they are ruptured by detonation of the explosive at which time the $BF_3$ poison is free to move and occupy a larger chamber within the reactor core. The explosive is fired when a signal of the proper magnitude is applied to the electronic trigger, that is when a signal of the proper magnitude is fed from a neutron sensing device to the second grid of the thyratron. The signal may be taken from any neutron sensing type instrument such as those commonly used to record reactor power.

Ionization chambers which are neutron responsive are well known in the art. Various neutron responsive ionization chambers are described in a text entitled "Radiation Dosimetry" by Hine Brownell, 1956 Ed., published by the Acadmeic Press, Inc., New York. The ionization chamber that was used with the electronic reactor safety control device of this invention consisted of two concentric tube graphite electrodes enclosed in a lead chamber in a helium atmosphere, with a suitable potential placed across them by means of an outside source of voltage supply not shown in FIG. 2. The outer tube electrode was coated on the inside surface with boron, enriched with boron-10. The inner electrode was coated on its outside surface with the same material. The walls of the graphite tubes of which the electrodes were formed were approximately ¼ inch thick. The inner tube electrode had an outside diameter of about 1 inch and the outer electrode had an outside diameter of about 2 inches. The electrodes were about 8 inches in length. Neutrons passing through the chamber cause ionization to be produced in the gas. The potential difference across the electrodes causes a current to flow in proportion to the ionization. The current caused to flow through the ionization chamber passes through a resistor interposed between the voltage supply source and an electrode of the ionization chamber. The potential drop across the resistor caused by the current flow is sensed by the log amplifier which feeds a signal of suitable amplification to the cathode follower and voltage divider which in turn controls the signal impressed on the 2nd grid of the thyratron.

In one embodiment of the electronic safety control device of this invention which gave good performance, the components of the system as shown in FIG. 2 and as described hereinabove were as follows: The electronic valve 9 was a 2D21 thyratron which has two grids; resistor 13 was a 5 watt 20K ohm resistor; resistor 18 was a ½ watt 510K ohm resistor; resistor 23 was a 5 watt 12K ohm resistor; resistor 24 was a ½ watt 1 megohm resistor; capacitor 12 was an electrolytic, 16 μf., 600 W.V.D.C. capacitor; capacitor 25 was a paper, 1 μf., 100 W.V.D.C. capacitor; transformer 16 was a Chicago Standard Transformer Corporation transformer PC 8401; the secondary winding 15 of this transformer was tapped to provide 235 volts A.C.; the other secondary winding 20 was made up of the two filament windings connected in series to provide 11.3 volts A.C.; diode 14 was a Westinghouse Type 320–M, 600 peak inverse volts diode; diode 19 was a Westinghouse type 320–A, 50 peak inverse volts diode; the electrical squib 26 was a Du Pont S–68 squib with a load of 4 grains of explosive and a resistance of approximately 1.5 ohms. The ionization chamber was described above. The log amplifier, and cathode follower and voltage divider are standard equipment. The actuator or reactor shutdown mechanism 27 was also described above.

In one application of the electronic reactor safety control device illustrated in the drawing, it was used to shut down the water boil reactor described in NAA–SR–1525 when the neutron flux had reached a value equivalent to a reactor power of about 1 kw. as determined by thermal power calibration, after the control rods were withdrawn to provide a power excursion in the reactor. At this power level the signal from the signal-producing means 1, which in this case was an ionization chamber, as described above and placed adjacent the outside surface of the graphite neutron reflector, was amplified by the log amplifier 4, and set on the voltage divider to be 8 volts at this power level. This is the value required of the signal on the second grid 8 of the thyratron in order to make the thyratron conduct. When the 8 volt signal was impressed on the second grid of the thyratron, it conducted, drawing current from ground through the electrical squib 26 of the neutron absorber release system 27 which extended into the core of the nuclear reactor tube. The passage of the current through the squib detonated it rupturing the diaphragms which retained the neutron poison gas, $BF_3$, in the storage chamber. This permitted the $BF_3$ gas to enter the chamber which projected into the reactor core. The reactor was shut down within 7 milliseconds of the time that the signal from the ionization gage caused the thyratron to conduct. The peak power reached by the reactor was limited to a value of 1.1 kw.

Without the safety device of this invention, upon the withdrawal of the control rods, the power of the reactor went to a value of 805 kw. At this power lever the formation of radiolytic gas due to the decomposition of the water in the homogeneous fuel solution created gaseous pockets or voids within the core solution effecting the shutdown. Thus the peak power without the safety device was 732 times greater than when the safety device of this invention was employed. Accordingly, when the electronic reactor safety control system of this invention is employed, the radiation from a nuclear reactor can be kept down to a safe level at all times. The control system can be set to shut down the nuclear reactor at any predetermined neutron flux level within the reactor by adjusting the voltage divider which controls the signal fed to the second grid of the thyratron.

While the above described experiment utilized an ionization chamber as a neutron-sensing device, other sensing devices can either replace the ionization chamber or be used in conjunction with it. For example, a bimetallic switch made of uranium-235 and zirconium can be placed within the reactor shield to serve as a neutron sensing device for the purpose of initiating a signal when the reactor period becomes too short. Such a sensing device employed with the electronic safety control system of this invention can function to shut down the reactor before it reaches an unsafe level of reactivity. In the bimetallic switch the uranium-235 will expand from fission heating while the zirconium will expand only upon ambient heating. Hence, in the case of a power excursion when the neutron flux is rising at an unsafe rate, the U-235 will heat more rapidly than the zirconium, causing the bimetallic strip to deform. This is taken advantage of by allowing the strip to close a circuit upon deformation which circuit is adapted to connect the second grid with the plate of the thyratron. This causes the thyratron to conduct shutting down the reactor. Other alternatives of impressing a signal on the second grid to activate the shut down mechanism will be obvious to those skilled in the art.

To test the effectiveness of the electronic reactor safety control device of this invention in case of a burnout of the cathode heater element in the thyratron, a switch was interposed between the heater element 21 and resistor 23 shown in FIG. 2. Upon throwing open the switch while the device was in operation the thyratron lost bias, conducted, and caused the electrical squib to explode thereby shutting down the reactor. In another test the line voltage was removed. Thereupon the thyratron lost bias, conducted, and again caused the electrical squib to explode resulting in a shutdown of the reactor.

Although the invention has been described and illustrated in detail, it is to be understood that the same is by way of illustration and example only and is not to be taken by way of limitation, the spirit and scope of this invention being limited only by the terms of the appended claims.

We claim:

1. A fail-safe control apparatus comprising an electronic valve having a pair of output electrodes and at least one biasing electrode, a source of operating potential coupled to said output electrodes to establish an operating potential across said output electrodes, bias means connected to one of said biasing electrodes for normally limiting conduction of said valve, an actuator connected to one of said output electrodes and operative in response to conduction of said valve in a predetermined amount, condition responsive means connected to one of said biasing electrodes for increasing conduction of said valve, and means connected to each of said output electrodes responsive to failure of said source for increasing conduction of said valve to said predetermined amount, whereby said actuator will be operated upon failure of said source.

2. A fail-safe control apparatus comprising an electronic valve having at least one biasing electrode, an anode, a cathode and a heater for said cathode, means for establishing an operating potential across said anode and cathode, biasing means connected to one of said biasing electrodes for limiting conduction of said valve, a voltage source coupled to said heater, an actuator connected to one of said anode and cathode and operative in response to a predetermined magnitude of conduction of said valve, condition sensing means connected to one of said biasing electrodes for causing said valve to conduct at said magnitude, and means connected to each of said output electrodes responsive to failure of said source for causing said valve to conduct at said magnitude whereby said actuator will be operated upon failure of said source.

3. A fail-safe control apparatus comprising an electronic valve having at least one biasing electrode, an anode, a cathode, and a heater for said cathode, a source of operating potential, means for establishing said operating potential across said anode and cathode, biasing means connected to one of said biasing electrodes for limiting conduction of said valve, a voltage source coupled to said heater, an actuator connected to one of said anode and cathode and operative in response to a predetermined magnitude of conduction of said valve, condition sensing means connected to one of said biasing electrodes for causing said valve to conduct at said magnitude and means connected to each of said output electrodes responsive to failure of one of said sources for causing said valve to conduct at said magnitude whereby said actuator will be operated upon failure of said source.

4. A fail-safe control apparatus comprising an electronic valve having at least one biasing electrode, an anode, a cathode, and a heater for said cathode, a source of operating potential, means for establishing said operating potential across said anode and cathode, biasing means connected to one of said biasing electrodes for limiting conduction of said valve, a voltage source coupled to said heater, an actuator connected to one of said anode and cathode and operative in response to a predetermined magnitude of conduction of said valve, and means connected to each of said anode and cathode responsive to the failure of one of said sources for causing said valve to conduct at said predetermined magnitudes so that said actuator is operated.

5. A fail-safe control apparatus comprising an electronic valve having a pair of biasing electrodes and a pair of output electrodes, a source of operating potential coupled to said output electrodes to establish an operating potential across said output electrodes, bias means connected to one biasing electrode for normally limiting conduction of said valve, an actuator connected to one of said output electrodes and operative in response to conduction of said valve in a predetermined amount, condition responsive means connected to the other biasing electrode for increasing conduction of said valve, a first storage means interposed between said source and said output electrodes for storing the output of said source for a period of time, and a second storage means interposed between said bias means and said valve for storing the output of said bias means for a second period of time less than said first period.

6. A control system for a nuclear reactor comprising, in combination, condition responsive means to produce an electrical signal in response to neutron flux activation in a nuclear reactor, a neutron absorbing safety control means positioned within said reactor, electrical means including at least one source of voltage coupled to said electrical signal-producing condition responsive means and said safety control means and responsive to said condition responsive means to provide a flow of electrical current through said safety control means, storage means connected to said electrical means for producing a flow of electrical current through said safety control means upon failure of one of said voltage sources thereby causing said safety control means to shut down said nuclear reactor.

7. A control system for shutting down a nuclear reactor comprising, in combination: a line voltage supply; an electronic means comprising a thyratron having a plate, a cathode, a cathode heater element, a first grid, and a second grid; a first electrical circuit means connected to the plate of said thyratron for supplying a plate voltage to said plate; a second electrical circuit means connected to said first grid and said cathode in said thyratron for supplying a bias voltage to said first grid; a condition responsive means to produce an electrical signal in response to neutron flux activation from a nuclear reactor, said condition responsive means being connected to said second grid for impressing said signal on said second grid and causing said thyratron to conduct at a predetermined value of said signal; a neutron absorbing control means comprising a resistance heater element for shutting down said reactor when said thyratron conducts electrical current; said first electrical circuit means comprising a first capacitor, a first resistor through which said first capacitor is charged, a current rectifying means, and a first alternating current source connected in series with the plate of said thyratron, said first capacitor serving as a storage means for storing the output of said first source for a first period of time; said second electrical circuit means comprising a second resistor, a second current rectifying means, a second alternating current source in series, connecting said first grid of said thyratron to a first terminal of said heater element in said thyratron; a terminal common to the second terminal of said heater element and to the cathode of said thyratron, said resistance heater element in said neutron absorbing control means having one end connected to ground and the other end connected to said common terminal, a third resistor connected in series with said second alternating current source and said heater element, a second capacitor connecting said first grid to the cathode of said thyratron for storing the output of said second source for a second period of time shorter than said first period, a fourth resistor in parallel with said second capacitor for determining the length of time that said second capacitor will store said output of said second source; wherein said first and said second alternating current sources are connected to said line voltage supply; whereby when said thyratron is caused to conduct, current flows from ground through said resistance heater element in said neutron absorbing control means causing said control means to operate for shutting down said nuclear reactor.

References Cited in the file of this patent

UNITED STATES PATENTS

| | | |
|---|---|---|
| 2,735,811 | Weinberg | Feb. 21, 1956 |
| 2,931,763 | Dever | Apr. 5, 1960 |

OTHER REFERENCES

Miller: "Reactor Safety Report," NAA–SR–1954 (August 15, 1957).

Weeks et al.: "Safety Device Tests in KEWBI"—SR–2476, January 28, 1958.